United States Patent Office 2,728,632
Patented Dec. 27, 1955

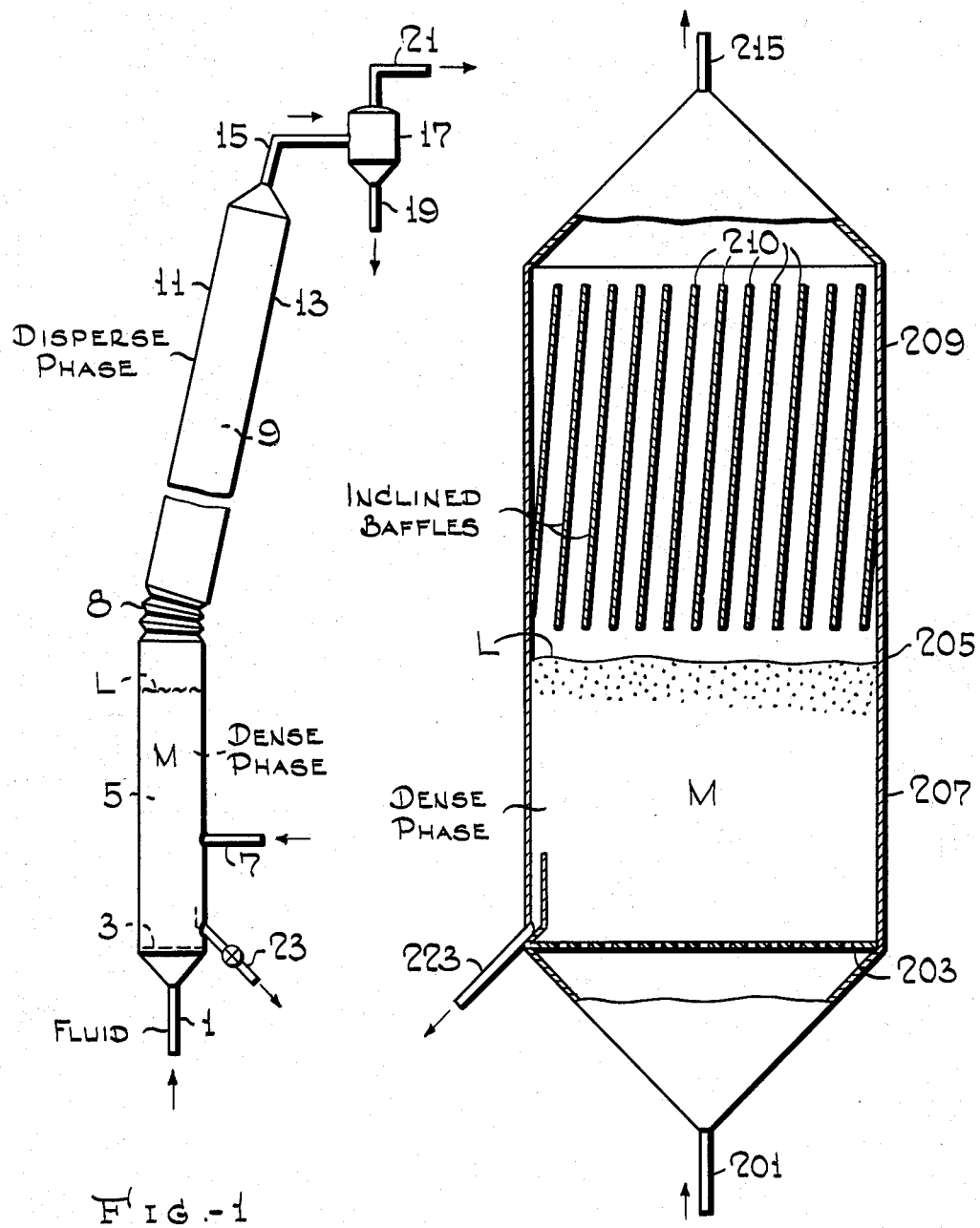

2,728,632

CONTROL OF SOLIDS CIRCULATION WITHIN FLUID-SOLIDS CONTACTING ZONES

George L. Matheson, Summit, N. J., assignor to Esso Research and Engineering Company, a corporation of Delaware Application November 30, 1951, Serial No. 259,097

17 Claims. (Cl. 23—1)

The present invention relates to an improved method of controlling solids circulation within zones wherein fluids are contacted with subdivided solids. More specifically, the invention pertains to a method and apparatus adapted to improve the circulation of subdivided solids in a vertical direction; to reduce the loss of subdivided solids by entrainment from turbulent solids masses fluidized by upwardly flowing fluids; and to restrict the particle size range of the solids carried overhead from the fluidized mass by the fluids and out of the fluids-solids contacting zone.

In its broadest aspect, the invention provides for forcing the fluid carrying entrained solids upwardly through a narrowly confined slightly inclined substantially unobstructed path. The invention has utility in contacting subdivided solids in a highly turbulent fluidized state with either liquid or gasiform materials.

When subdivided solids are contacted with liquids in a system involving "particulate fluidization," i. e. a condition in which the solid particles are individually and uniformly dispersed in an upwardly flowing liquid[1] the liquid containing the dispersed solids is passed upwardly through an inclined path.

When applied to systems employing "aggregative fluidization,"[1] i. e. relatively dense turbulent beds of subdivided solids fluidized by upwardly flowing gases or vapors to resemble a boiling liquid separated by an interface from an upper disperse phase of substantially lower density, the invention provides for passing the disperse phase upwardly through an inclined narrowly confined path which is in direct communication with the dense phase fluidized mass.

The advantages of this aggregative fluidization or so-called fluid solids technique are well recognized. Improved gas-solids and solids-solids contacting, uniformity of temperature, efficient heat transfer and ease of solids handling distinguish the technique from others employing the solids in the form of fixed or compact moving beds or dilute suspensions. However, the technique has certain limitations.

For example, proper fluidization is bound to a definite particle size distribution for any given material and gas velocity. A material having a particle size range of, say, 30–200 microns may be properly fluidized at superficial linear gas velocities of about 0.1–3 ft. per second. It is difficult, however, to maintain the particle size distribution within the desirable range because the particles of relatively small size within this range have a stronger tendency to be removed by entrainment than relatively large particles.

This problem arises in many applications of the fluid-solids technique, such as catalytic cracking, reforming, hydrogenating, and other petroleum refining operations, various catalytic or thermal reduction, oxidation and polymerization processes, gasification or carbonization of coal, etc.

[1] Ind. Eng. Chem. vol. 41, No. 6, p. 1250 (1949).

In addition, many processes involve rapid disintegration of solids at fluidization conditions whereby large proportions of particles of excessively small size are introduced into the fluid mass. These fines must be removed to maintain proper fluidization, without excessive removal of particles within the desirable size ranges. Typical examples for operations involving this condition are the fluid-type distillation of oil shale and the iron-catalyzed synthesis of hydrocarbons from CO and $H_2$.

Other processes involve the simultaneous use in the same fluidized bed of different particles of different size intended to be retained in the fluidized bed for different lengths of time or to be removed from different sections of the contacting zone. Classifying elutriation of the particles to be held for the shortest time or to be removed overhead is desirable in these cases. Various processes employing the pebble heater principle for direct heat supply or withdrawal in fluidized beds, catalytic processes involving the use of solid catalysts and inert diluents, the treatment of solids naturally occurring or originally produced in particle sizes varying over a wide range, such as coal slack, natural clays, etc., and various other processes have to rely on procedures of this type.

In liquid-solids contacting involving particulate fluidization intensive solids circulation in a vertical direction is desirable to maintain the temperature uniform over the entire height of the fluidized phase. This is difficult to accomplish particularly in high temperature operations conducted in the conventional manner, for example in the slurry polymerization of unsaturated hydrocarbons with phosphoric acid catalysts supported on carrier solids, such as clay. Also, at high liquid velocities solids entrainment from the fluidized reaction zone is a problem.

Prior to the present invention, expanded settling zones have been used in fluid-type solids-gas and solids-liquid contacting to reduce excessive solids carry-over or to restrict solids carry-over to particles of a definite size. Also high-efficiency or multi-stage cyclone separator systems have been employed. However, these known means are either of low efficiency or rather expensive to install and maintain. The present invention provides a simple and highly efficient means adapted to alleviate these difficulties.

It is, therefore, the principal object of the present invention to provide improved means for improving solids circulation and controlling solids losses by entrainment from turbulent solids masses fluidized by upwardly flowing fluids. A more specific object of this invention is to provide means permitting the elutriating classification of subdivided solids carried overhead by entrainment from such turbulent fluidized masses.

Other objects and advantages will appear from the description of the invention hereafter wherein reference will be made to the accompanying drawing in which Figure 1 is a schematical illustration of equipment adapted to carry out an embodiment of the invention; and Figure 2 is a similar illustration of a different modification of the invention.

It is known that a fairly sharp separation of fluidized solids into small sized and larger sized fractions may be accomplished by elutriation with a gas in a relatively tall column providing a relatively high disperse phase or "outage" of, say, about 20 ft. It is necessary for this purpose to maintain the linear superficial gas velocity about 0.2–2.0 ft. above the terminal velocity of fall of the coarse material. The coarse material, while originally entrained, is selectively refluxed in the disperse phase and returned to the fluid bed. It is the degree of this reflux that controls the particle size distribution of the material ultimately carried overhead.

Prior to the present invention it was believed that the degree of reflux at a given gas velocity is solely a function of the height of the disperse phase. Solids entrainment was, therefore, mainly controlled by varying the height of the disperse phase by means of raising or lowering the level of the fluidized bed. This is undesirable since other process variables, such as solids hold-up and gas contacting time are affected.

It has now been found that the reflux intensity in the disperse phase may be considerably increased and solids entrainment correspondingly reduced by prescribing an inclined path for the disperse phase above the dense phase level. Slight deviations from the vertical, not exceeding about 30° are sufficient, inclinations of about 1–15° being preferred.

The effect obtainable in accordance with the invention is demonstrated by the following experiments. A mass of silica-alumina gel having a particle size of about 60–90 microns, averaging about 80 microns, was fluidized with air flowing at a velocity of 0.67 ft. per second in a glass tube of 1¼ inches in diameter and 30 inches in length. The lower portion of the tube was vertically arranged over a length of about 4 inches. The upper remaining portion was adjusted at various inclinations from the vertical. The dense phase level was located at about 3 inches above the bottom end of the tube. The solids entrainment rate was measured for various positions of the upper tube portion as grams of solid entrained in 10 minutes. The results were as follows:

| Deviation from the Vertical | Entrainment Rate, gms./10 min. |
|---|---|
| 0° | 0.38 |
| 0° 35' | 0.17 |
| 0° | 0.41 |
| 1° 10' | 0.04 |
| 0° | 0.37 |

The effect of an inclination even as slight as 1° 10' is an entrainment reduction of about 90% in this case in which solids of a relatively narrow size range were employed.

It will also be noted that the entrainment rate drops sharply as the angle of inclination increases. Of course, the lower the entrainment rate, the smaller will be the particle size of the solids actually carried out of the reactor, and vice versa. The process of the invention, therefore, may be readily used for the elutriating classification of subdivided solids, the particle size of the entrained and retained solids depending on the angle of inclination of the disperse phase at otherwise equal conditions.

Visual observation of the behavior of the fluidized and disperse phases in a glass column has aided an understanding of this effect. Most of the powder carried from the dense phase into the disperse phase forms twisting streamers of relatively high density. These streamers originate in, and form over the entire height of, the disperse phase and fall back into the dense phase. This phenomenon may be explained as follows. Gas tends to flow around any cluster cloud of particles. The particles in the gas cannot follow the angular acceleration of the gas around the cloud, they go straight ahead and join the cluster or cloud. This builds up the size of the cloud so that it falls due to its own weight. If sufficient height for the disperse phase (outage) is provided above the dense bed, most of the powder leaving the dense bed is returned thereto in this manner before it can reach the top of the vessel to be removed therefrom in the form of entrainment. However, an undesirably high outage is needed for this purpose.

When an inclined outage is used in accordance with the invention, the streamers tumble sidewise toward the lower inclined surface and seem to "stick" to this surface, a continuous stream of powder flowing back over this surface into the dense bed. However, there is a limit to the distance that the streamers will tumble sidewise and, therefore, the upper and lower inclined surfaces prescribing the inclined path should not be too far apart. The proper distance separating the two surfaces defining the inclined path is a function of the height of the outage, good results being obtained at ratios of outage height to path diameter of at least about 4:1 and preferably about 8–12:1.

It has also been observed that in conventional operation the streamers fall much more slowly at relatively high pressures conducive to high gas densities than at lower pressures and lower gas densities. The result is an increase of the entrainment rate at increased pressures. The present invention, therefore, has particular utility in high pressure operation carried out at pressures of, say, 100–1000 p. s. i. g. because the adverse effect of the pressure increase on entrainment rate may be largely eliminated by increasing the reflux intensity in the disperse phase.

Another highly desirable effect of the invention is that much of the powder is returned to the bed before it is carried overhead very far from the bed. This is important in high temperature operations, such as coal gasification. In conventional operation, the entrained coal powder carries sensible heat far away from the bed into cyclone separators in which the temperature is lower than the reaction temperature. The powder is returned to the bed through dip-pipes but it is cooled considerably in the upper section of the reaction vessel and the cyclones. This heat loss must be made up by additional coal combustion. When applying the invention to this type of operation, entrainment is considerably reduced, resulting in substantial savings in heat supply and combustion air or oxygen required.

The process of the invention may be carried out in a fluid-type reactor having a lower vertical section containing the dense fluidized solids phase and a relatively tall upper section having a length over diameter ratio of about 4–15:1, preferably about 8–12:1 and an inclination from the vertical of not more than about 30°, preferably about 1°–15°. In commercial operation, a single reactor outage having this length to diameter ratio may involve excessive reactor heights. Such excessive heights may be avoided by fluidizing the solids in an overall vertical reactor of conventional dimensions and placing in the upper section above the dense phase level a plurality of baffles inclined and spaced from each other so as to subdivide the disperse phase into a plurality of inclined channels, each having the desired length over diameter ratio of about 4–15:1 in accordance with the invention.

Fluidization conditions suitable for the purposes of the invention are those conventional for fluid-solids handling. Suitable gas velocities depend on the particle size and specific gravity of the solids involved. However, conditions should be so controlled that a relatively dense fluidized solids phase having an apparent density of, say, about ⅓ to ⅔ of the particle density is formed which is separated by an interface from an upper disperse phase having a substantially lower density of, say, about 0.001 to 0.1 lb./cu. ft. In general, particle sizes of about 10–200 microns are suitable at linear superficial gas velocities in the dense phase of about 0.1–3 ft. per second.

The effect of the inclined path of the disperse phase on entrainment is appreciable at all velocities adapted to entrain solids from the dense phase. However, this effect is less pronounced, at very high gas velocity in the disperse phase. Linear gas velocities in the disperse phase of about 0.5–3.0 ft. per second are most suitable for the invention, particularly when applied to the elutriating classification of solids.

While reference has been made above chiefly to the aggregative fluidization of subdivided solids by upwardly flowing gases or vapors, the invention as mentioned above is not limited to this type of fluidization. Advantageous effects may also be obtained when applying the principles of the invention to suspensions of subdivided solids in liquids in which the fluidization is particulate in nature, for example in slurry polymerization, water clarification, etc.

In this application of the invention the vertical section of the contacting vessel may be very short or completely omitted, the bed level being maintained within the inclined section. As in aggregative fluidization, the slight inclination promotes the rapid return of solids down to the bottom of the bed. This may be of importance in achieving temperature equalization within the vessel. In a vertical vessel, on the other hand, there is little top to bottom mixing in particulate fluidization.

Fluidization conditions in particulate fluidization are generally similar to those of aggregative fluidization, although coarser solids particle sizes of, say, up to about 20 mesh may be employed in a narrower range and the liquid flow velocity may be somewhat lower than in aggregative fluidization for similar particles of comparable size. More specifically, in particulate fluidization the liquid velocity may be below the free fall velocity of the particles while in aggregative fluidization the gas velocity is normally above the free fall velocity of all particles. Suitable liquid velocities depend on the viscosity of the liquid, being the lower the higher the viscosity. Specific velocities may be readily calculated for any liquid on the basis of the free fall velocity of the solid particles.

Having set forth the objects and general nature of the invention, preferred methods of applying the same will be briefly described with reference to the drawing.

Referring now to Figure 1 of the drawing, there is shown a fluid-solids contacting vessel having a vertical lower section 5 and an inclined upper section 9, of substantially the same diameter. Section 5 is provided in its bottom with a gas distributing grid 3. Section 9 feeds into a cyclone separator 17. The section 8 connecting section 5 with section 9 is preferably flexible to permit variations in the angle of inclination of section 9. For example, this connecting section may be made of a metal bellows type of construction. The ratio of height over diameter of section 9 is preferably about 10:1. The height of section 5 should be sufficient to accommodate the dense fluid phase completely so that the dense phase level L lies below section 8 when the vessel is in use.

The operation of this system will be described using the elutriating classification by particle size of a fluidizable mass of subdivided solids as an example. It should be understood however that this or similar systems may be used in a generally analogous manner to carry out all types of fluid-solids contacting processes wherein entrainment control is a desirable feature.

In operation, a fluidizing gas, such as air, steam or any other gas inert at the contacting conditions, is supplied via line 1 through grid 3 to vertical section 5 of the contacting vessel. The feed rate of the gas is so controlled that it attains a linear superficial gas velocity of about 0.5–2 ft. per second in the vessel. Simultaneously the solids to be classified are fed through line 7 at a point above grid 3. By way of example, these solids may be a mixed alumina silica gel having a particle size distribution about as follows:

Microns: Percent
0–40 _____ 10–20
40–80 _____ 20–40
80–150 _____ 20–40
>150 _____ 20–30

In this manner, a dense highly turbulent fluidized solids mass M is formed in section 5, having an upper interface L and an apparent density of about 30–50 lbs. per cu. ft. The position of level L depends on the feed rate of solids and gases, the level being the higher, the higher these feed rates. However, as mentioned above care should be taken to prevent level L from exceeding vertical section 5, because otherwise gas bubbles will accumulate on the upper surface 11 of the inclined section 9.

At the conditions specified, substantial solid entrainment overhead from level L takes place and twisting streamers of entrained solids are formed in inclined section 9 of the contacting vessel. The particle size of the solids so entrained may range from 0–80 microns at 1 ft./sec. to 0–150 microns at 2 ft./sec. At higher velocities the particle size of the entrained solids will be correspondingly larger. These streamers are deflected by surface 11 toward surface 13 to which they adhere. This effect is much greater than would be expected from the fact that the solids are subjected to a partial component only of the upward gas flow. The result is a steady reflux of solids downwardly along surface 13 and back into mass M. The solids so refluxed are mainly of the particle size range of 40–150 microns. Smaller sized solids are carried overhead out of section 9 and via line 15 into cyclone separator 17. Fine solids may be recovered via line 19 and gases are vented via line 21. Part of the stream from line 19 may be recycled to the vessel.

It will be appreciated that solids of a certain small particle size may be continuously recovered via line 19 from the original solids mixture. If it is desired to recover simultaneously a definite fraction of relatively coarse solids, operation may be batchwise and coarse solids may be withdrawn from a lower portion of section 5 via line 23 after the fine material has been removed overhead as described.

Of course, the particle size of the entrainment solids recovered via line 19 may be controlled within narrow limits by properly adjusting the angle of inclination of section 9 and the gas velocity. Various fractions of different particle size may be taken overhead successively in this manner either in continuous or batch operation.

By way of example, the table given below illustrates conditions operative for the purposes of this embodiment of the invention.

| Particle Diameter (Microns) | Minimum Superficial Gas Velocity for Carrying Solids Overhead in Vertical Chamber (ft./sec.) | Maximum Angle of Inclination permitting Carry-over of Solids at 0.67 ft./sec. |
|---|---|---|
| 30 | 0.12 | 30° |
| 40 | 0.21 | 10° |
| 60 | 0.47 | 3° |
| 80 | 0.67 | 0° |

The system of Figure 1 permits of certain modifications. Instead of using distributing grid 3, the solids and gases may be injected together into section 5 in the form of a suitable solids-in-gas suspension by means of suitable distributing means. Cyclone 17 may be arranged within section 9, if desired.

Referring now to Figure 2 of the drawing, the system illustrated consists essentially of a vertical fluid-solids contacting vessel 205 of conventional shape and dimensions. However, the upper section 209 of vessel 205 is provided with a plurality of inclined baffles 210 defining a plurality of inclined narrow pathways for upflowing fluids. The angle of inclination of baffles 210 may be adjustable which may be accomplished by a system of levers in a manner obvious to those skilled in the art. The system of Figure 2 may be used for the same purposes as that of Figure 1. Its application will be briefly described using the catalytic hydroforming of hydrocarbons as an example.

A suspension of hydroforming catalyst-in-oil vapors is supplied at a reaction temperature of about 850°–1000° F. and a pressure of about 150–1000 p. s. i. g. from line 201 through distributing grid 203 to the lower portion 207 of reactor 205. The catalyst may be a group VI metal oxide, such as molybdenum oxide or platinum carried on alumina, or any other conventional hydroforming catalyst. The particle size distribution of the catalyst may be as follows:

| | Percent |
|---|---|
| 40–80 microns | 40 |
| 80–150 microns | 60 |

The fed rates of hydrocarbon vapors and catalyst are so adjusted that a dense, turbulent fluidized mass M having an apparent density of about 15–30 lbs. per cu. ft. is formed in section 207 below interface L. Linear superficial vapor velocities of about 0.3–1.5 ft. per second are normally suitable for this purpose. If desired, steam may be added via line 201 to assist in proper fluidization of mass M.

Normally it is desirable to entrain overhead from mass M, and thus remove from the reaction, catalyst fines of less than about 40 microns in diameter while retaining coarser material in the dense phase M. This is accomplished in accordance with the invention by the arrangement of inclined baffles 210 in the upper section 209 of reactor 205. These baffles are preferably so arranged that the space of section 209 of reactor 205 consists of a plurality of narrow inclined passageways each having a ratio of length over spacing distance of at least 4:1 and an angle of inclination from the vertical of, say, about 5°–15°. While baffles 210 preferably extend to the top of section 209, care should be taken that level L is maintained below baffles 210 to avoid fluidization difficulties.

When operating in this manner, catalyst particles larger than about 40 microns diameter are continuously refluxed along the lower inclined surface of each passageway. Only smaller particles are carried overhead via line 215. These particles may be discarded from the product recovery system (not shown) in any conventional manner. Used catalyst of a desirable particle size distribution may be withdrawn via line 223 and passed to regeneration (not shown) and reuse.

If no inclined baffles 210 were used in accordance with the invention, a highly complicated and expensive gas-solids separation system would be required to retain the desired proportion of intermediate size solids in mass M at the high pressures and resulting high gas densities involved.

The system of Figure 2 permits of similar modifications as that of Figure 1. When applied to the treatment of solids suspended in liquids, the inclined baffles are arranged within the single suspension phase. In this case the baffles speed up the circulation of solids from top to bottom. This is useful in slurry operations, such as olefin polymerization, water clarification or other processes employing particulate fluidization. For example, in settling operations of the type carried out in conventional thickeners inclined baffles arranged within the suspension will accelerate the settling rate of the solids from the liquid flowing upwardly at a low velocity.

Other fluid-type chemical catalytic or non-catalytic reactions may be carried out in a generally analogous manner in systems of the type illustrated in Figure 2. Examples are catalytic cracking, high pressure processes, such as the synthesis of hydrocarbons from $H_2$ and CO, destructive or non-destructive hydrogenation, etc., coal carbonization or gasification, shale distillation, etc.

The above description and exemplary operations have served to illustrate specific embodiments of the invention. It will be understood that the invention embraces such other variations and modifications as come within the spirit and scope thereof.

What is claimed is:

1. The process of contacting fluids with subdivided solids, which comprises forming a turbulent suspension of said solids in said fluids flowing upwardly through a contacting zone, and while still in said contacting zone passing said suspension upwardly through an extended narrowly confined inclined path which deviates from the vertical by between about 1° and about 30° and has a length over diameter ratio of at least about 4:1.

2. The process of contacting fluids with subdivided solids, which comprises forming a turbulent suspension of said solids in said fluids flowing upwardly through a contacting zone, and while still in said contacting zone passing said suspension upwardly through an extended narrowly confined inclined unobstructed path which deviates from the vertical by between about 1° and about 30° and has a length over diameter ratio of at least about 4:1.

3. The process of contacting gasiform materials with subdivided solids, which comprises forming a relatively dense turbulent suspension of said solids in said materials flowing upwardly through a vertical contacting zone, upwardly entraining solids from said relatively dense suspension in said upwardly flowing materials to form a relatively dilute suspension of said entrained solids in said materials and passing said dilute supenion upwardly within said contacting zone through an extended narrowly confined inclined path which deviates from the vertical by between about 1° and about 30° and has a length over diameter ratio of at least about 4:1.

4. The process of claim 3 in which said deviation is about 1°–15°.

5. The process of contacting gasiform materials with subdivided solids, which comprises forming a relatively dense turbulent fluidized suspension of said solids in said materials flowing upwardly through a vertical contacting zone, upwardly entraining solids from said relatively dense suspension in said upwardly flowing materials to form a relatively dilute suspension of said entrained solids in said materials, superimposed on and separated by an interface from said dense suspension, passing said dilute suspension upwardly through an extended narrowly confined inclined path deviating from the vertical by an angle of between about 1° and about 30° and having a ratio of length over diameter of at least 4:1 and withdrawing from an upper portion of said path a suspension of substantially lower density than that of said dilute suspension entering said path.

6. The process of claim 5 in which the particle size of said solids falls within the approximate range of 10–200 microns and the velocity of said materials on said path is about 0.5–3 ft. per second.

7. The process of claim 5 in which said ratio is about 8–12:1.

8. The process of claim 5 in which said angle is increased within the range indicated so as to decrease the density of said withdrawn suspension and the particle size of the solids withdrawn therewith.

9. The process of contacting gasiform materials with subdivided solids, which comprises forming a relatively dense turbulent fluidized suspension of said solids in said materials flowing upwardly through a vertical contacting zone, upwardly entraining solids from said relatively dense suspension in said upwardly flowing materials to form a relatively dilute suspension of said entrained solids in said materials, superimposed on and separated by an interface from said relatively dense suspension, passing said dilute suspension as a whole upwardly through a single extended narrowly confined inclined path extending said contacting zone in an upward direction, said path deviating from the vertical by between about 1° and about 30° and having a ratio of length over diameter of at least 4:1 and withdrawing from an upper portion of said path a suspension of substantially lower density than that of said dilute suspension entering said path.

10. The process of claim 9 in which the average particle size of the solids of said withdrawn suspension is substantially smaller than that of the solids of said dilute suspension.

11. The process of claim 10 in which said first-named particle size is controlled by varying said angle, the latter being increased as the former exceeds a desired range.

12. The process of claim 9 in which the linear velocity of said materials in said contacting zone is in excess of the free fall velocity of all particles of said solids.

13. The process of contacting gasiform materials with subdivided solids, which comprises forming a relatively dense turbulent fluidized suspension of said solids in said materials flowing upwardly through a vertical contacting zone, upwardly entraining solids from said relatively dense suspension in said upwardly flowing materials to form in an upper portion of said vertical zone a relatively dilute suspension of said entrained solids in said materials, superimposed on and separated by an interface from said relatively dense suspension, passing said dilute suspension in said upper portion upwardly through a plurality of extended narrowly confined inclined passageways which deviate from the vertical by between about 1° and about 30° and have a length over diameter ratio of about at least 4:1 and withdrawing from an upper portion of said passageways a suspension of substantially lower density than that of said dilute suspension entering said passageways.

14. Apparatus for contacting fluids with subdivided solids, which comprises a vertical chamber, an inclined chamber superimposed on and in open communication with said vertical chamber, the inclination of said inclined chamber from the vertical being between about 1° and about 30° and having a length over diameter ratio of at least about 4:1, means for adjusting said inclination within the range indicated, means for feeding fluids and subdivided solids to a lower portion of said vertical chamber and means for withdrawing fluids from an upper portion of said inclined chamber.

15. Apparatus for contacting fluids with subdivided solids, which comprises a vertical contacting chamber, a plurality of substantially parallel spaced baffles arranged within said chamber, said baffles being arranged in an inclined position deviating from the vertical by an angle of between about 1° and about 30° and having a length over diameter ratio of at least about 4:1, said baffles extending from an intermediate portion to the top portion of said chamber and across the entire width of said chamber so as to define a plurality of narrowly confined extended inclined passageways in an upper portion of said chamber, means for feeding fluids and subdivided solids to a lower portion of said chamber at a point substantially below the lower ends of said baffles, means for causing turbulent contact between said fluids and solids in said lower portion, and means for withdrawing fluids from an upper portion of said chamber.

16. The process of contacting fluids with subdivided solids according to claim 1 in which the fluid is a liquid.

17. The process of contacting fluids with subdivided solids according to claim 16 in which the turbulent relatively dense suspension of solids in liquids flows upwardly through the contacting zone at a velocity below the free fall velocity of all particles of said solids.

References Cited in the file of this patent
UNITED STATES PATENTS

| | | |
|---|---|---|
| 947,642 | Leave | Jan. 25, 1910 |
| 1,845,058 | Pier | Feb. 16, 1932 |
| 2,364,145 | Huppke et al. | Dec. 5, 1944 |
| 2,403,375 | Kassel | July 2, 1946 |
| 2,455,561 | Creelman | Dec. 7, 1948 |
| 2,464,812 | Johnson | Mar. 22, 1949 |
| 2,488,033 | Johnson | Nov. 15, 1949 |